(12) United States Patent
Keihl et al.

(10) Patent No.: US 8,217,297 B2
(45) Date of Patent: Jul. 10, 2012

(54) EDM ELECTRODE GUIDE

(75) Inventors: Jon Keihl, Versailles, OH (US); Kevin Herzog, Eaton, OH (US)

(73) Assignee: Lam Research Corporation, Fremont, CA (US)

( * ) Notice: Subject to any disclaimer, the term of this patent is extended or adjusted under 35 U.S.C. 154(b) by 498 days.

(21) Appl. No.: 12/502,468

(22) Filed: Jul. 14, 2009

(65) Prior Publication Data

US 2010/0308018 A1    Dec. 9, 2010

Related U.S. Application Data (60) Provisional application No. 61/184,873, filed on Jun. 8, 2009.

(51) Int. Cl.
     *B23H 1/04*            (2006.01)

(52) U.S. Cl. .................................................. 219/69.15

(58) Field of Classification Search ............... 219/69.14, 219/69.15, 69.17, 69.16, 69.2, 69.12; 204/224 M; 205/653, 665, 640
See application file for complete search history.

(56) References Cited

U.S. PATENT DOCUMENTS

| | | | | |
|---|---|---|---|---|
| 3,775,580 A | * | 11/1973 | Scherbaum | ................ 219/69.15 |
| 3,939,321 A | | 2/1976 | Bertrand et al. | |
| 4,654,499 A | | 3/1987 | Houman et al. | |
| 4,713,515 A | | 12/1987 | Choi | |
| 4,791,264 A | * | 12/1988 | Walser | ........................ 219/69.12 |
| 4,896,012 A | * | 1/1990 | Barbulescu | ................ 219/69.12 |
| 4,922,074 A | | 5/1990 | Sebzda, Sr. | |
| 5,585,013 A | | 12/1996 | Truty | |
| 5,614,108 A | | 3/1997 | Habel et al. | |
| 5,908,563 A | | 6/1999 | Barbulescu | |
| 6,783,438 B2 | | 8/2004 | Aloise et al. | |
| 7,207,111 B2 | | 4/2007 | Aloise et al. | |
| 2010/0224543 A1 | * | 9/2010 | Ellis et al. | .................. 210/198.2 |
| 2010/0233572 A1 | * | 9/2010 | Yajima et al. | ................. 429/483 |

FOREIGN PATENT DOCUMENTS

| | | | | |
|---|---|---|---|---|
| GB | 2331476 A | * | 5/1999 | |
| JP | 2003-200319 A | * | 7/2003 | |

* cited by examiner

*Primary Examiner* — Geoffrey S Evans
(74) *Attorney, Agent, or Firm* — Dinsmore & Shohl LLP (57) ABSTRACT

In accordance with one embodiment of the present disclosure, an electrical discharge machine is provided comprising an EDM electrode, an electrode holder, and an electrode guide. The electrode guide comprises an internal passage profile that transitions along the machining axis from a substantially circular cross section comprising a diameter d2 to an apexed cross section. The EDM electrode extends from the electrode holder through the electrode entrance aperture of the electrode guide and out of the electrode exit aperture of the electrode guide. The apexed cross section of the electrode guide is aligned relative to the circular cross section of the electrode guide such that apexes of the electrode exit aperture lie outside of a circumferential portion of the circular cross section. A restricted circumferential portion defined by the apexed cross section comprises a diameter that is greater than the effective electrode diameter. Additional embodiments are disclosed.

17 Claims, 8 Drawing Sheets

EDM ELECTRODE GUIDE

CROSS REFERENCE TO RELATED APPLICATIONS

This application claims the benefit of U.S. Provisional Application Ser. No. 61/184,873, filed Jun. 8, 2009.

BACKGROUND

The present disclosure relates to electrical discharge machining (EDM) devices and, more particularly, to EDM electrode holders comprising improved internal passage profiles.

BRIEF SUMMARY

According to the subject matter of the present disclosure, EDM electrode holders are provided comprising internal passage profiles that transition from a substantially circular cross section to an apexed cross section that minimizes electrode-to-guide contact, provides relatively large exhaust areas in the vicinity of the electrode tip, helps prevent flow blockage in the vicinity of the electrode tip, and enhances electrode stability during machining to improve machining accuracy and precision.

In accordance with one embodiment of the present disclosure, an electrical discharge machine is provided comprising an EDM electrode, an electrode holder, and an electrode guide. The electrode guide comprises an internal passage profile that transitions along the machining axis from a substantially circular cross section comprising a diameter d2 to an apexed cross section. The EDM electrode extends from the electrode holder through the electrode entrance aperture of the electrode guide and out of the electrode exit aperture of the electrode guide. The apexed cross section of the electrode guide is aligned relative to the circular cross section of the electrode guide such that apexes of the electrode exit aperture lie outside of a circumferential portion of the circular cross section. A restricted circumferential portion defined by the apexed cross section comprises a diameter that is greater than the effective electrode diameter.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
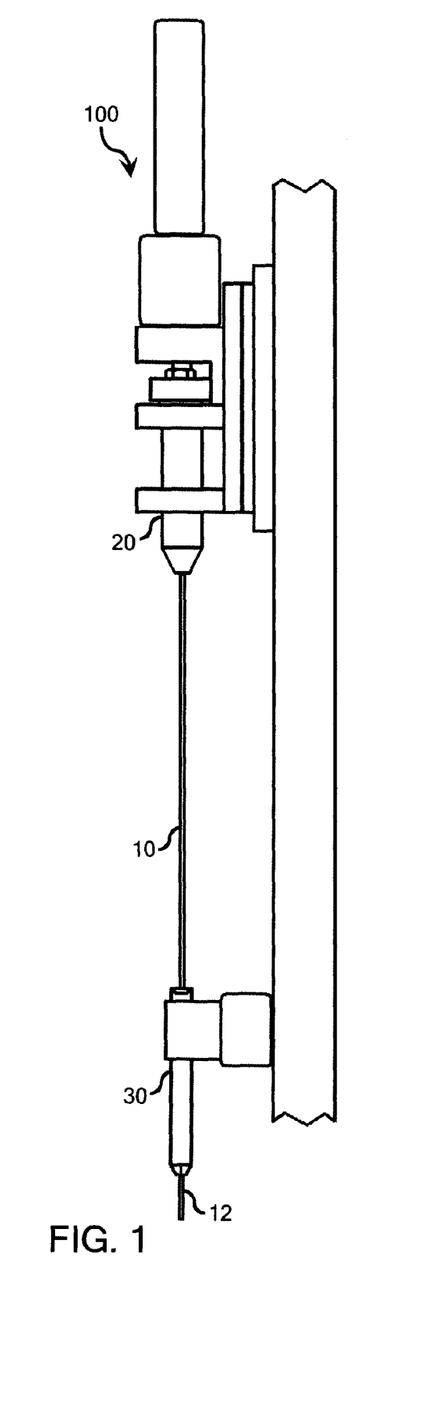
FIG. 1 illustrates an electrical discharge machine incorporating an electrode guide according to the present disclosure.

Referring initially to FIG. 1, an electrical discharge machine 100 is illustrated comprising an EDM electrode 10, an electrode holder 20, and an electrode guide 30. The electrode holder 20 and the electrode guide 30 cooperate to align the EDM electrode 10 along a machining axis of the electrical discharge machine 100. The electrode holder 20 is typically configured to impart rotary motion to the electrode 10 during machining and can be configured to facilitate convenient replacement of the electrode 10.

Although the concepts of the present invention are not limited to specific electrode types, electrodes usually employed for electrical discharge machining comprise outside diameters of between approximately 0.1 mm and approximately 0.2 mm and lengths of between approximately 150 mm and approximately 300 mm. One end of the electrode 10 is clamped in the electrode holder 20, which may comprise a high-speed spindle, and the other end of the electrode 10 extends through the electrode guide, which is typically fixed a few millimeters above a workpiece. The electrode holder 20 can be used to rotate the electrode to help remove debris from the work zone and improve hole quality. Electrode wear during the machining process can be compensated for with Z movement of the electrode 10 and holder 20.

Electrical discharge machines according to the present disclosure often utilize dielectric fluids to enhance EDM operations. For example, a dielectric fluid can be directed through a generally longitudinal interior fluid passage of the electrode 10 in the direction of the machining tip 12 of the electrode 10. This fluid is often directed through the electrode interior at a relatively high pressure to help align the electrode 10 along the machining axis of the electrical discharge machine 100. Machining electrodes according to the present invention may be formed of a variety of suitable materials including, but not limited to, tungsten, tungsten carbide, brass, or copper alloys and may define a variety of cross sectional shapes. Regardless of the particular cross sectional shape in use, it is convenient to describe the electrode as comprising an effective electrode diameter d1 because the rotation of the electrode will define a circumferential periphery with each 360° of rotation.

Figure 9A:
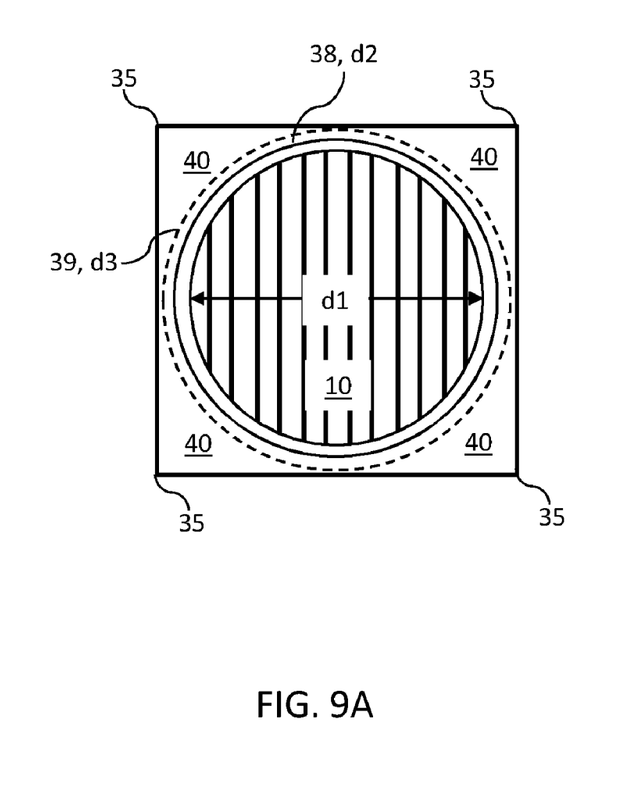
FIGS. 9A-9G are schematic illustrations of the relative arrangement of the EDM electrode and the circular and apexed cross sections of alternative electrode guides according to the present disclosure.
Figure 9B:
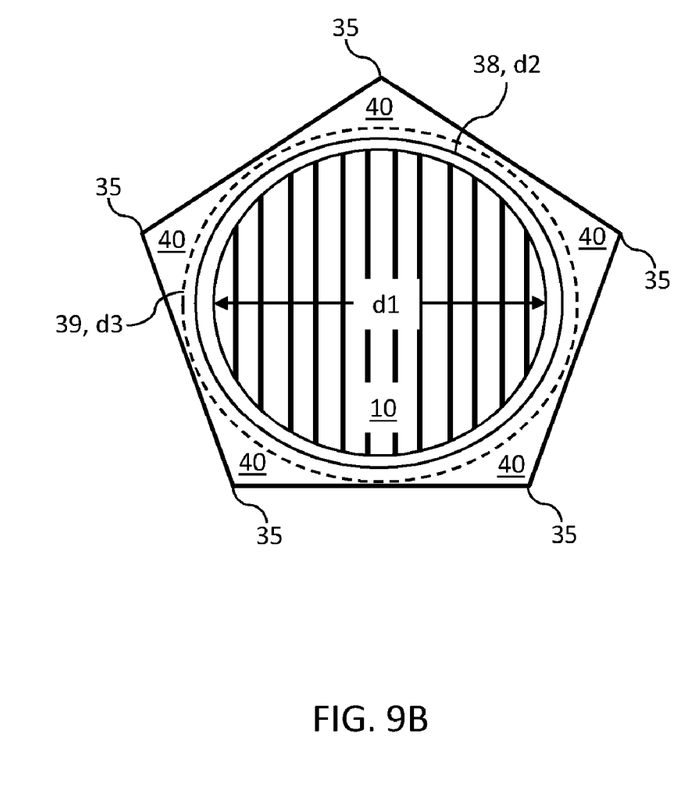
Figure 9C:
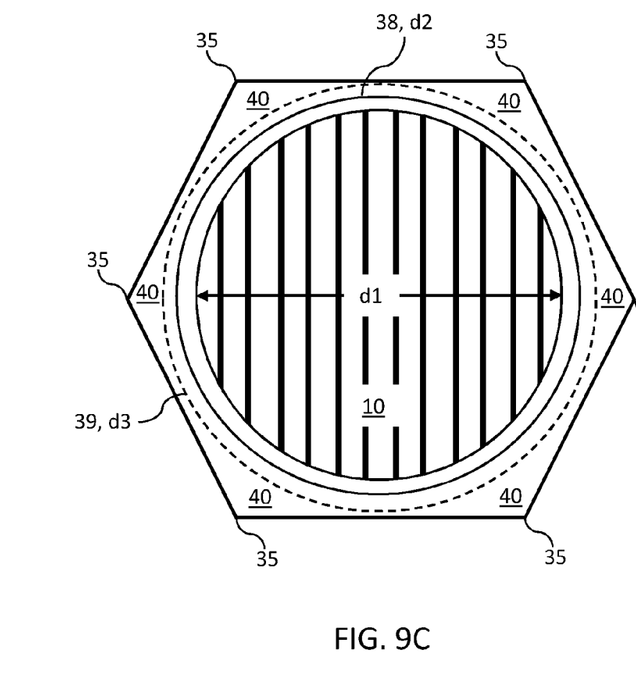
Figure 9D:
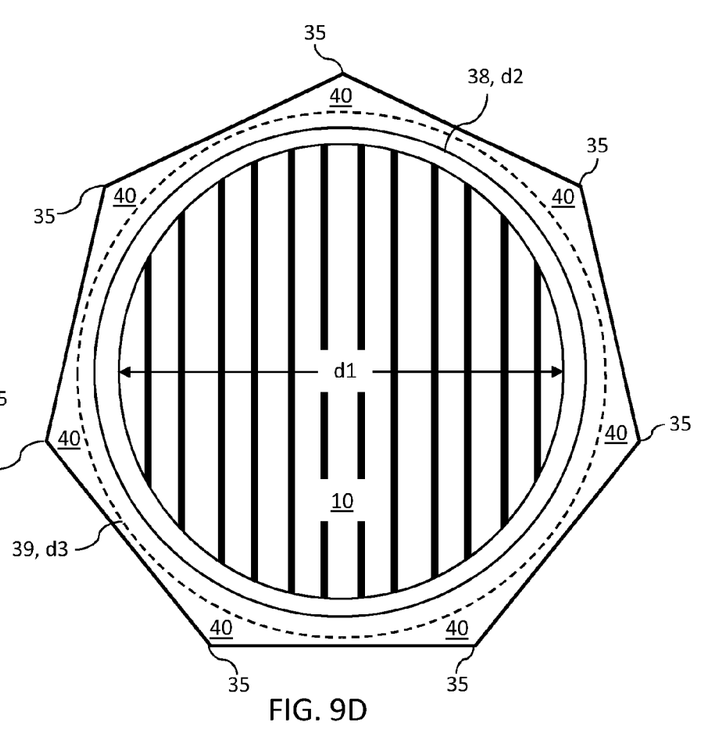
Figure 9E:
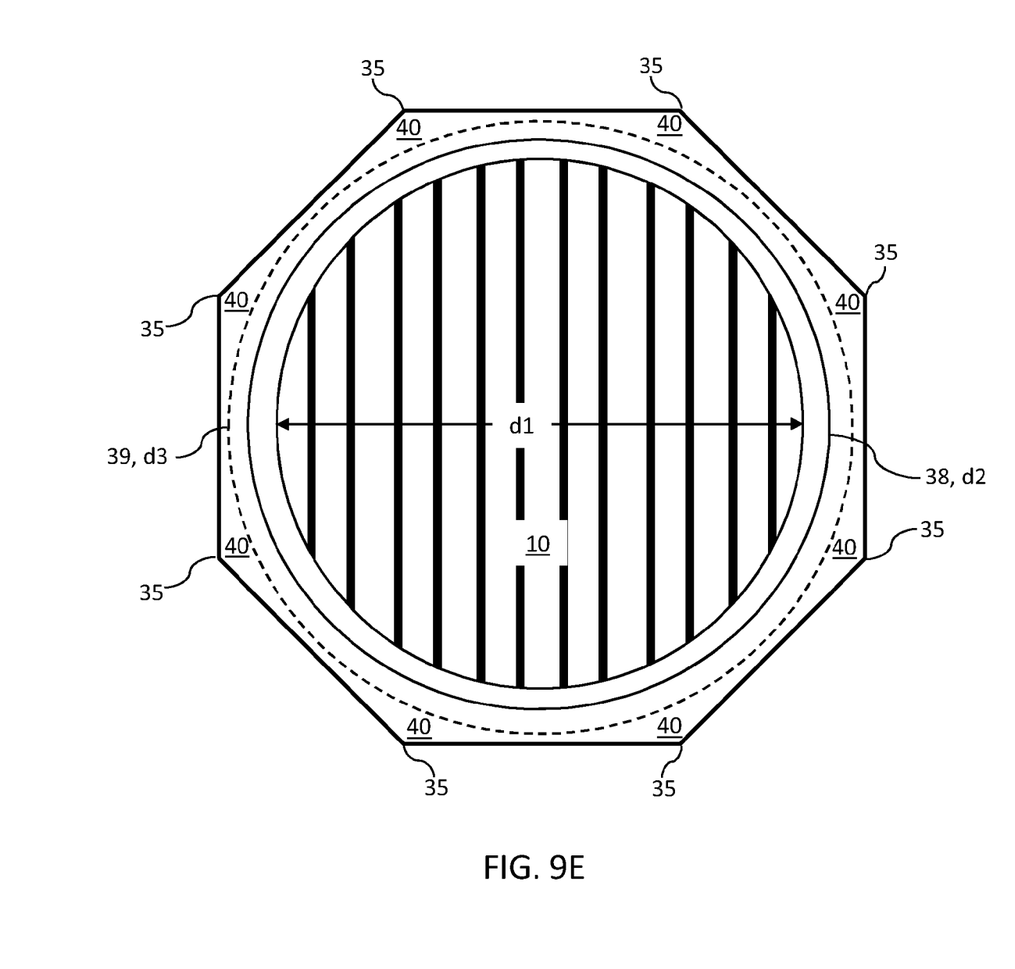
Figure 9F:
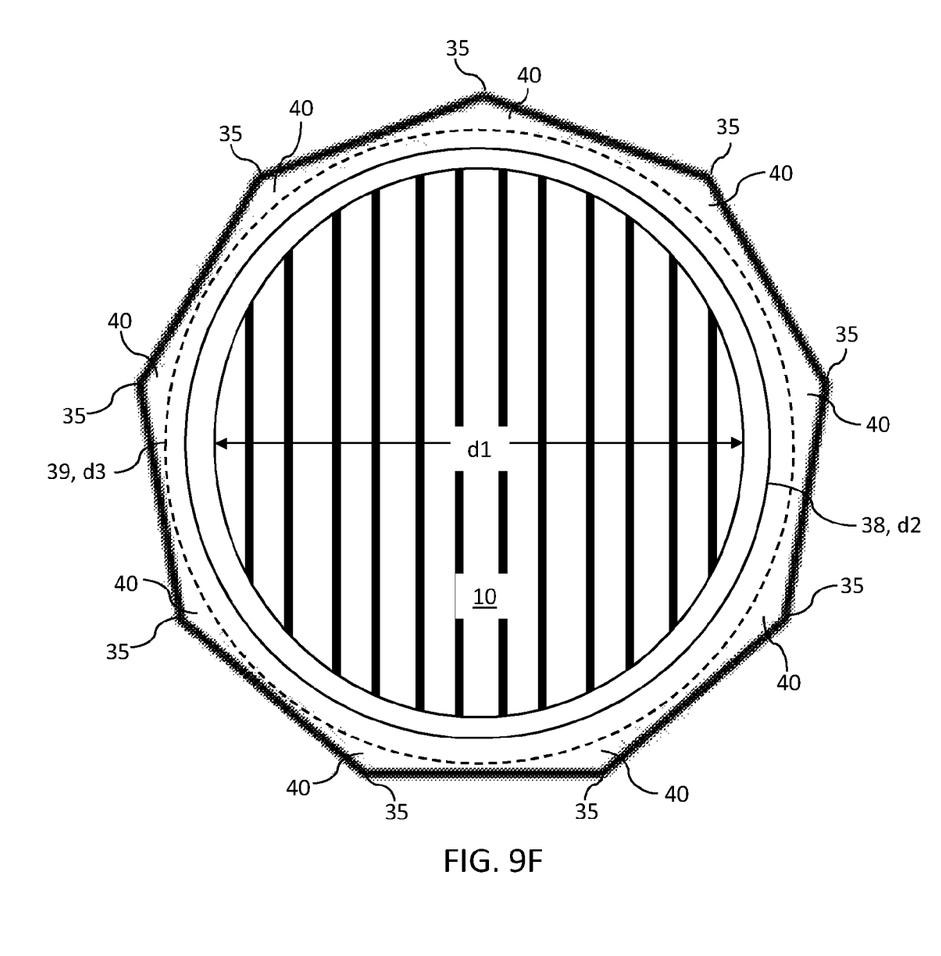
Figure 9G:
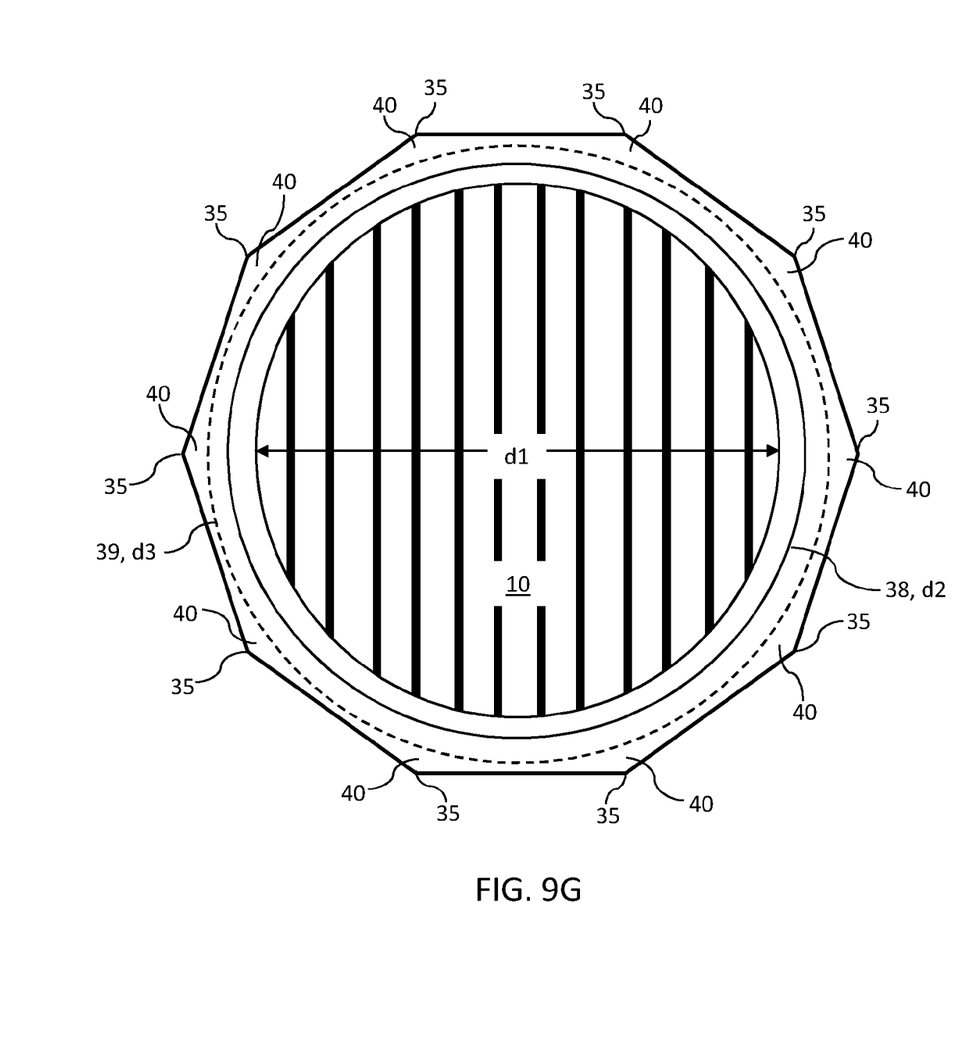

Beyond the above identification of some of the more common components of an electrical discharge machine and their general functions, the present description does not present a detailed illustration of the basic operating principles or components of electrical discharge machines because these principles are well documented in the art. Turning to more particular concepts of the present disclosure, it is noted that the electrode guide 30 comprises an internal passage 32 that transitions along the machining axis from a substantially circular cross section comprising an electrode entrance aperture 34 of diameter d2 to an apexed cross section comprising an electrode exit aperture 36, which is illustrated in FIGS. 2-7 as a triangular cross section but may comprise a cross section in the form of a rectangle (FIG. 9A), a pentagon (FIG. 9B), a hexagon (FIG. 9C), a heptagon (FIG. 9D), an octagon (FIG. 9E), a nonagon (FIG. 9F), a decagon (FIG. 9G), etc. In general, a triangular cross section is preferred because it maximizes the exhaust areas 40 subtended by the individual apexes 35 outside of the circular cross section of the internal passage 32.

The EDM electrode extends from the electrode holder through the electrode entrance aperture 34 of the electrode guide 30 and out of the electrode exit aperture 36 of the electrode guide 30. As is illustrated in FIGS. 1 and 2, the electrode entrance aperture comprises an inwardly tapered portion comprising a diameter that contracts along the machining axis in the direction of the exit aperture.

Figure 6:
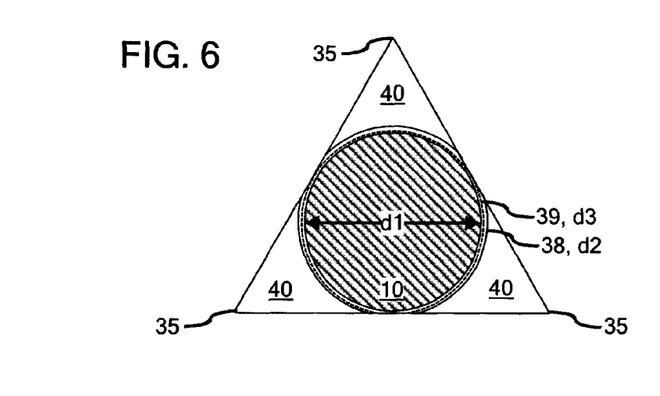
FIG. 6 is a schematic illustration of the relative arrangement of the EDM electrode and the circular and apexed cross sections of an electrode guide according to the present disclosure.
Figure 7:
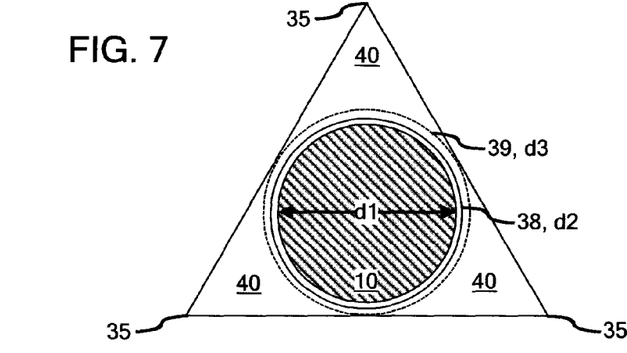
FIG. 7 is a schematic illustration of the relative arrangement of the EDM electrode and the circular and apexed cross sections of an alternative electrode guide according to the present disclosure.
Figure 8:
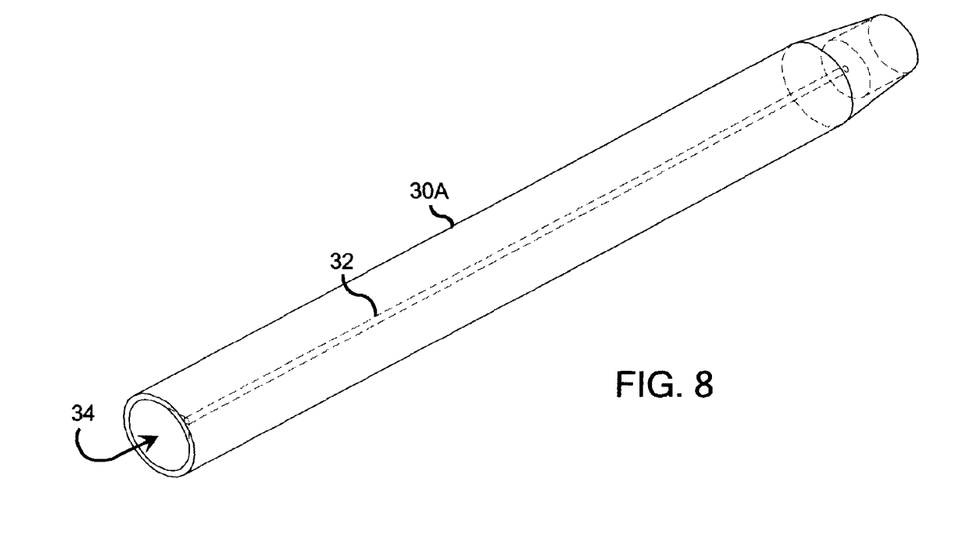
FIG. 8 is an isometric illustration of a metallic body portion of an electrode guide according to the present disclosure.

As is illustrated schematically in FIGS. 6 and 7, the apexed cross section of the electrode guide 30 is aligned relative to the circular cross section of the electrode guide 30 such that apexes 35 of the electrode exit aperture 36 lie outside of a circumferential portion 38 of the circular cross section to define respective exhaust areas 40. In general, the triangular cross sections illustrated in FIGS. 6 and 7 are preferred over geometric shapes with more than three apexes because the triangular shape maximizes the extent of the exhaust areas 40 subtended by the individual apexes 35 outside of the circular cross section of the internal passage 32. To help ensure that the EDM electrode 10 can pass freely through the exit aperture 36, the restricted circumferential portion 39 defined by the apexed cross section comprises a diameter $d_3$ that is greater than the effective electrode diameter $d_1$.

By way of comparison, FIGS. 6 and 7 illustrate that the diameter $d_3$ of the apexed cross section can be greater than or less than the diameter $d_2$ of the substantially circular cross section of the internal passage. As a further alternative, the diameter $d_3$ of the apexed cross section can be approximately equal to the diameter $d_2$ of the substantially circular cross section of the internal passage. It is noted, however, that the embodiment illustrated in FIG. 6, where the diameter $d_3$ of the apexed cross section is less than the diameter $d_2$ of the substantially circular cross section, may advantageously limit excessive movement of the EDM electrode in the vicinity of the machining tip 32.

Figure 2:
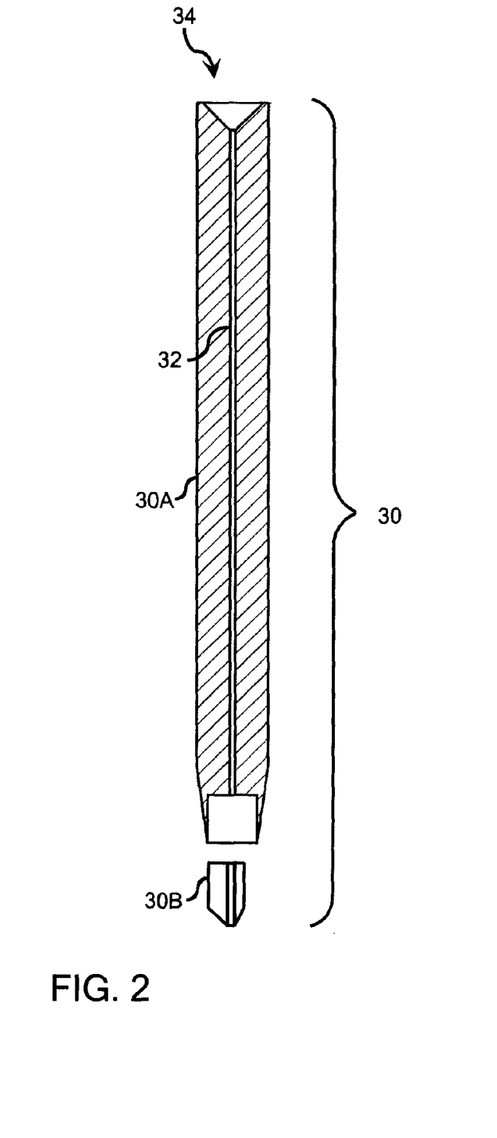
FIG. 2 is a partial exploded view of an electrode guide according to the present disclosure.
Figure 3:
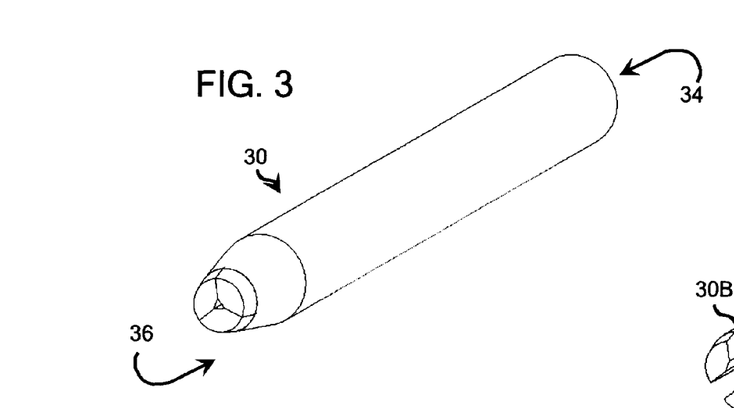
FIGS. 3 and 4 are assembled and exploded views of an electrode guide according to the present disclosure.
Figure 4:
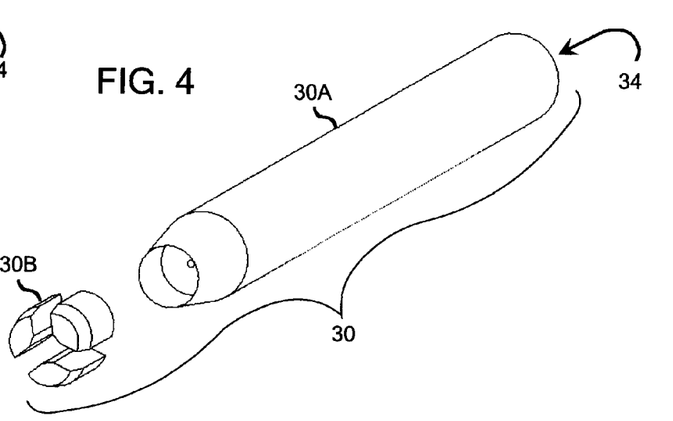
Figure 5:
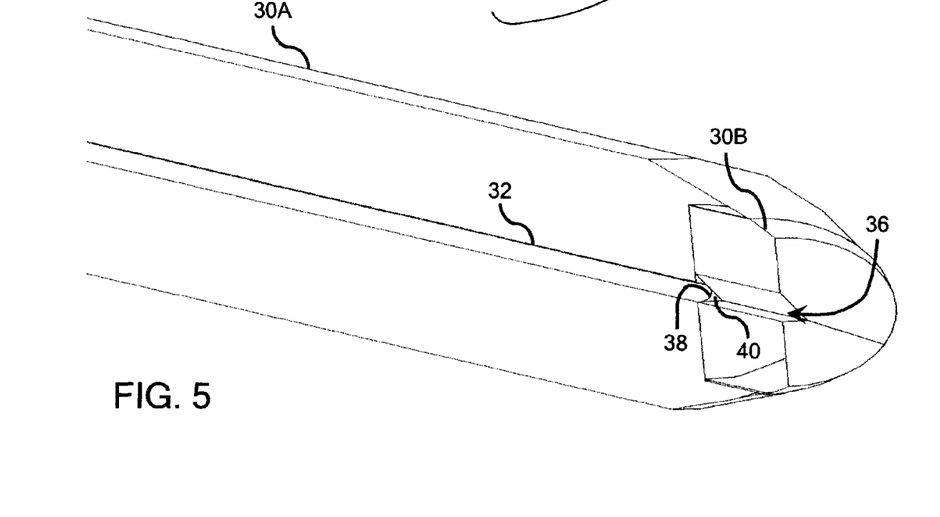
FIG. 5 is a partial cross-sectional illustration of the electrode guide illustrated in FIGS. 3 and 4.

Referring to FIG. 3 and the exploded views of FIGS. 2 and 4, it is noted that the electrode guide 30 comprises a metallic body portion 30A that forms the substantially circular cross section of the internal passage 32 and a ceramic insulator 30B forming the apexed cross section of the internal passage 32. The ceramic insulator 30B is nested into and extends longitudinally from a cavity formed in an end portion of the metallic body portion 30A. It is contemplated that the ceramic insulator 30B can be nested into the metallic body cavity in a press-fit configuration, with or without the aid of a bonding agent. As is illustrated in FIGS. 1-4, a first distal end of the electrode guide is formed by the metallic body portion 30A at the electrode entrance aperture 34 and a second distal end of the electrode guide is formed by the ceramic insulator 30B at the electrode exit aperture 36. In this manner, those operating the electrical discharge machine 100 can be assured that the ceramic insulator 30B defines the point of closest approach to the workpiece to be machined.

For clarity, although the ceramic insulator 30B illustrated in FIGS. 3 and 4 comprises a plurality of independent pieces that cooperate to form the apexed cross section, FIG. 2 only illustrates one of the three components of the ceramic insulator 30B. FIG. 3 illustrates the fully assembled electrode guide 30 comprising the ceramic insulator 30B and the metallic body portion 30A. By way of illustration, and not limitation, the metallic body portion may comprise an aluminum, stainless steel, or other metallic body portion suitable for EDM machining applications. Similarly, the ceramic insulator may comprise ceramic-filled PEEK™ (polyetheretherketone), carbide, or another electrically-insulating ceramic suitable for EDM machining applications.

Although the concepts of the present disclosure are intentionally presented herein without reference to specific dimensions for the EDM electrode 10 or the electrode guide 30, the relative dimensions of these components and features of these components may be pertinent to those practicing the concepts of the present disclosure. For example, in some embodiments, it may be advantageous to ensure that the diameter $d_3$ of the apexed cross section is at least 0.0005 inches (0.0125 mm) less than the diameter $d_2$ of the substantially circular cross section of the internal passage. From a more global perspective it may be advantageous to ensure that the following relationships hold for the respective diameters $d_1$, $d_2$, and $d_3$:

EDM electrode dimensions: 0.0128 inches(0.325 mm)$\leq d_1 \leq$0.0132 inches(0.335 mm);

Electrode/Circular Passage Clearance: $d_2-d_1 \leq$0.005 inches (0.125 mm); and Electrode/Apexed Passage Clearance: $d_3-d_1 \leq$0.0007 inches (0.0175 mm).

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it will be apparent that modifications and variations are possible without departing from the scope of the invention defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. An electrical discharge machine comprising an EDM electrode, an electrode holder, and an electrode guide, wherein:
   the electrode holder and the electrode guide cooperate to align the EDM electrode along a machining axis of the electrical discharge machine;
   the EDM electrode comprises an effective electrode diameter $d_1$;

the electrode guide comprises an internal passage profile that transitions along the machining axis from a substantially circular cross section comprising a diameter d2 to an apexed cross section;

the circular cross section of the electrode guide comprises an electrode entrance aperture;

the apexed cross section of the electrode guide comprises an electrode exit aperture;

the EDM electrode extends from the electrode holder through the electrode entrance aperture of the electrode guide and out of the electrode exit aperture of the electrode guide;

the apexed cross section of the electrode guide is aligned relative to the circular cross section of the electrode guide such that apexes of the electrode exit aperture lie outside of a circumferential portion of the circular cross section; and a restricted circumferential portion defined by the apexed cross section comprises a diameter d3 that is greater than the effective electrode diameter d1.

2. An electrical discharge machine as claimed in claim 1 wherein the electrode guide comprises a metallic body portion forming the substantially circular cross section of the internal passage and a ceramic insulator forming the apexed cross section of the internal passage.

3. An electrical discharge machine as claimed in claim 2 wherein the metallic body portion comprises an aluminum body portion.

4. An electrical discharge machine as claimed in claim 2 wherein the ceramic insulator comprises ceramic-filled polyetheretherketone.

5. An electrical discharge machine as claimed in claim 2 wherein a first distal end of the electrode guide is formed by the metallic body portion at the electrode entrance aperture and a second distal end of the electrode guide is formed by the ceramic insulator at the electrode exit aperture.

6. An electrical discharge machine as claimed in claim 2 wherein the ceramic insulator comprises a plurality of independent pieces that cooperate to form the apexed cross section.

7. An electrical discharge machine as claimed in claim 2 wherein the ceramic insulator is nested into and extends longitudinally from a cavity formed in an end portion of the metallic body portion.

8. An electrical discharge machine as claimed in claim 7 wherein the ceramic insulator is nested into the metallic body cavity in a press-fit configuration, with the aid of a bonding agent, or both.

9. An electrical discharge machine as claimed in claim 1 wherein the electrode entrance aperture comprises an inwardly tapered portion comprising a diameter that contracts along the machining axis in the direction of the exit aperture.

10. An electrical discharge machine as claimed in claim 1 wherein the diameter d3 of the apexed cross section is approximately equal to the diameter d2 of the substantially circular cross section of the internal passage.

11. An electrical discharge machine as claimed in claim 1 wherein the diameter d3 of the apexed cross section is greater than the diameter d2 of the substantially circular cross section of the internal passage.

12. An electrical discharge machine as claimed in claim 1 wherein the diameter d3 of the apexed cross section is less than the diameter d2 of the substantially circular cross section of the internal passage.

13. An electrical discharge machine as claimed in claim 1 wherein the diameter d3 of the apexed cross section is at least 0.0005 inches (0.0127 mm) less than the diameter d2 of the substantially circular cross section of the internal passage.

14. An electrical discharge machine as claimed in claim 1 wherein the following relationships hold for the respective diameters d1, d2, and d3:

0.0128 inches (0.32512 mm)$\leq$d1$\leq$0.0132 inches (0.33528 mm);

d2−d1$\leq$0.005 inches (0.127 mm); and d3−d1$\leq$0.0007 inches (0.0178 mm).

15. An electrical discharge machine as claimed in claim 1 wherein the apexed cross section of the internal passage comprises a triangular cross section.

16. An electrical discharge machine as claimed in claim 1 wherein the apexed cross section of the internal passage comprises a cross section in the form of a rectangle, a pentagon, a hexagon, a heptagon, an octagon, a nonagon, or a decagon.

17. An electrode guide comprising a metallic body portion, a ceramic insulator, and an internal passage profile, wherein:

the internal passage profile transitions from a substantially circular cross section to an apexed cross section;

the circular cross section of the electrode guide comprises an electrode entrance aperture;

the apexed cross section of the electrode guide comprises an electrode exit aperture;

the apexed cross section of the electrode guide is aligned relative to the circular cross section of the electrode guide such that apexes of the electrode exit aperture lie outside of a circumferential portion of the circular cross section;

the metallic body portion forms the substantially circular cross section of the internal passage;

the ceramic insulator forms the apexed cross section of the internal passage; and the electrode entrance aperture comprises an inwardly tapered portion comprising a diameter that contracts along an axis extending from the entrance aperture in the direction of the exit aperture.

\* \* \* \* \*